United States Patent [19]
Kutsumi et al.

[11] Patent Number: 5,625,553
[45] Date of Patent: Apr. 29, 1997

[54] MACHINE TRANSLATION SYSTEM GENERATING A DEFAULT TRANSLATION

[75] Inventors: Takeshi Kutsumi, Yamatokooriyama; Chinami Hino, Sakai; Ichiko Sata, Nara; Yoji Fukumochi, Kobe, all of Japan

[73] Assignee: Sharp Kabushiki Kaisha, Osaka, Japan

[21] Appl. No.: 261,094

[22] Filed: Jun. 16, 1994

[30] Foreign Application Priority Data

Jun. 17, 1993 [JP] Japan ..................... 5-146041

[51] Int. Cl.$^6$ .............. G06F 17/28; G06F 17/27
[52] U.S. Cl. ........................ 395/752; 395/759
[58] Field of Search ............. 364/419.08, 419.02; 395/759, 752

[56] References Cited

U.S. PATENT DOCUMENTS 4,916,614  4/1990  Kaji et al.

OTHER PUBLICATIONS

*Word Processing and Maching Translation*, pp. 88–97.

Primary Examiner—Gail O. Hayes
Assistant Examiner—George Stevens

[57] ABSTRACT

In a machine translation system, a default translation flag for indicating a default equivalent word is set in a dictionary in a memory. A normal equivalent-word selector of a translation module executes semantic analysis on a case structure tree determined by a dictionary-lookup morpheme analyzing part, a syntax analyzer, and a tree structure transforming unit. If the case structure tree has failed in the semantic analysis, a special equivalent-word selector executes a default translation processing to adopt the default equivalent word indicated by the default translation as an optimum equivalent word such that the case structure tree is passed. Thus, even if the case structure tree has failed in the semantic analysis due to strict semantic restrictions, a translation can be securely generated. Further, if the case structure tree has not failed in the semantic analysis, a high-accuracy translation can be generated.

28 Claims, 11 Drawing Sheets

Fig.3

TEXT : This is a pen.

| t | h | i | s | | | | |
|---|---|---|---|---|---|---|---|
| i | s | | | | | | |
| a | | | | | | | |
| p | e | n | | | | | |
| . | | | | | | | |

| | | Pronoun | Demonstrative adjective | |
|---|---|---|---|---|
| this | —— | Pronoun | Demonstrative adjective | |
| is | —— | Verb | | |
| a | —— | Article | | |
| pen | —— | Noun | | |

*Fig.5*
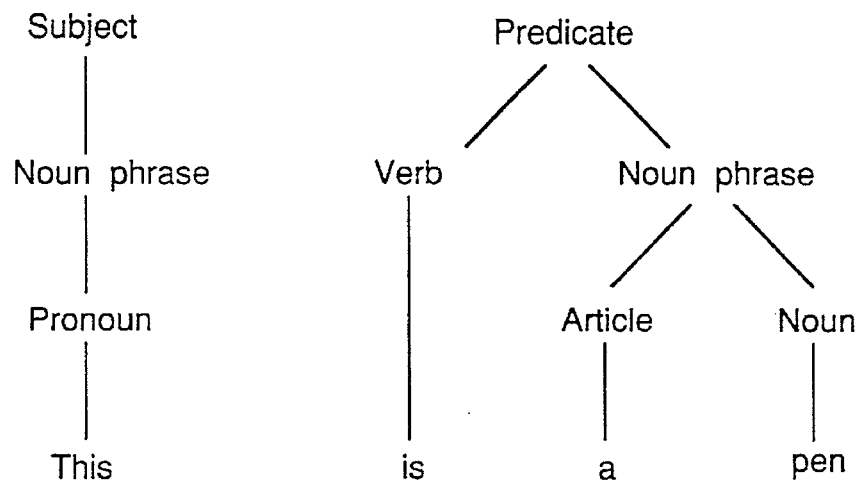
*Fig.6*
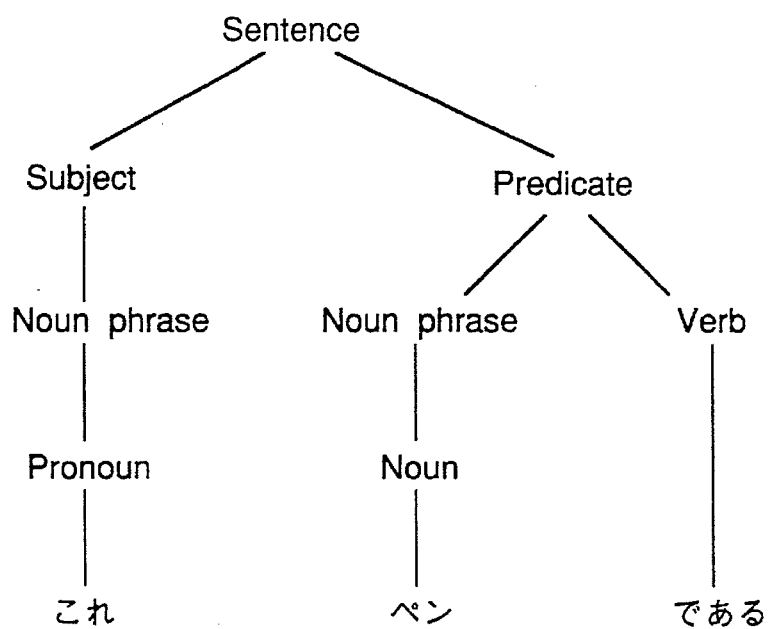
*Fig.7*
これはペンである。

Fig.8

[ENTRY WORD : play] [PART OF SPEECH : Verb]

| SURFACE-CASE PATTERN NO. | DEFAULT TRANSLATION FLAG | EQUIVALENT-WORD PAGE NO. | EQUIVALENT WORD | FIRST-CASE SEMANTIC RESTRICTION | SECOND-CASE SEMANTIC RESTRICTION |
|---|---|---|---|---|---|
| 00 | 0 | 000 | する | \<human being\> | \<sport\> |
| 00 | 1 | 001 | プレイする | \<human being\> | \<game\> |
| 00 | 0 | 002 | 演奏する | \<human being\> | \<musical instrument\> |
| 00 | 0 | 003 | 果たす | \<human being\> | \<obligation or business-like deed\> |

Fig. 9

| CONDITION NO. | DEFAULT TRANSLATION PREFERENCE CONDITIONS |
|---|---|
| 00 | Automated divisional translation mode is currently set, and a text part including the word being an object of the equivalent-word selection processing does not form such a phrase as is sufficiently perfect to enable the semantic analysis thereon. |
| 01 | A subordinate word, which is the object of semantic analysis, has only a default-like semantic attribute. |
| 02 | A "default translation" preference condition prescribed by translation rules is satisfied. |
| 03 | The default translation preference mode has been set by the user. |

Fig.12

[ENTRY WORD : introduce]  [PART OF SPEECH : Verb]

| SURFACE-CASE PATTERN NO. | DEFAULT TRANSLATION FLAG | EQUIVALENT-WORD PAGE NO. | EQUIVALENT WORD |
|---|---|---|---|
| 00 | 0 | 000 | Equivalent word to be inputted |
| 00 | 1 | 001 | 紹介する |
| 00 | 0 | 002 | 導入する |
| 00 | 0 | 003 | 輸入する |
|  |  |  |  |

Fig.13

| ENGLISH WORD     : introduce | DEFAULT EQUIVALENT WORD |
|---|---|
| SURFACE-CASE PATTERN NO.<br>NO. 00        : SUBJECT+VERB+NOUN PHRASE<br>NO. 01        : SUBJECT+VERB+PREPOSITION PHRASE (as)<br>NO. 02        : SUBJECT+VERB+PREPOSITION PHRASE (to)<br>NO. 03        : SUBJECT+VERB+PREPOSITION PHRASE (into) | 紹介する<br>紹介する<br>紹介する<br>導入する |
| SELECTION NO.    : 0_ |  |

Fig.14

| | |
|---|---|
| ENGLISH WORD | : introduce |
| SURFACE-CASE PATTERN NO. | : 00 (SUBJECT+VERB+NOUN PHRASE) |
| DEFAULT EQUIVALENT WORD | : NO. 001 (紹介する) |

| | |
|---|---|
| EQUIVALENT-WORD PAGE NO. | |
| NO. 000 | : Equivalent word to be inputted |
| NO. 001 | : 紹介する |
| NO. 002 | : 導入する |
| NO. 003 | : 輸入する |

| | |
|---|---|
| SELECTION NO. | : 0_ |

Fig.15

[ENTRY WORD : introduce] [PART OF SPEECH : Verb]

| SURFACE-CASE PATTERN NO. | DEFAULT TRANSLATION FLAG | EQUIVALENT-WORD PAGE NO. | EQUIVALENT WORD |
|---|---|---|---|
| 00 | 1 | 000 | 先導する |
| 00 | 0 | 001 | 紹介する |
| 00 | 0 | 002 | 導入する |
| 00 | 0 | 003 | 輸入する |
| | | | |

Fig.16

[ENTRY WORD : introduce]　[PART OF SPEECH : Verb]

| SURFACE-CASE PATTERN NO. | DEFAULT TRANSLATION FLAG | EQUIVALENT-WORD PAGE NO. | EQUIVALENT WORD |
|---|---|---|---|
| 00 | 0 | 000 | Equivalent word to be inputted |
| 00 | 0 | 001 | 紹介する |
| 00 | 1 | 002 | 導入する |
| 00 | 0 | 003 | 輸入する |
|  |  |  |  |

Fig.17

TRANSLATION1:　私は、ピアノを演奏する。

TRANSLATION2:　私は、コンピュータをプレイする。

TRANSLATION3:　私は、高価な機械を買った ‖ 私の息子がプレイする。

MACHINE TRANSLATION SYSTEM GENERATING A DEFAULT TRANSLATION

BACKGROUND OF THE INVENTION

1. Field of the Invention

The present invention relates to a machine translation system capable of automatically translating input sentences in a natural language to a target language.

2. Description of the Background

Conventional machine translation systems for automatically translating an input sentence in a natural language to a target language have the following functions:

(1) A semantic analysis function: a function of selecting a semantically correct parse tree from among a plurality of parse trees obtained as a result of syntactic analysis performed on an input sentence, wherein the selection of the parse tree utilizes semantic restriction information described in a dictionary for both a word of restricting-side (i.e., a word accompanied by a case and imposing various restrictions on the case, like a verb) and another word of restricted-side (a word serving as the case for the restricting-side word and subjected to various restrictions from the restricting-side word, like a noun);

(2) A divisional translation function: a function of generating translations individually for partial parse trees (partial trees) when a perfect syntactic analysis tree that would cover a whole sentence cannot be obtained by syntactic analysis, as is the case with an imperfect input sentence in which some indispensable case is omitted or with an input sentence including a syntactic structure that does not meet syntactic analysis rules;

(3) A semantic attribute imparting function: a function of, when the restricted-side word is a registered word of a user dictionary or a technical term dictionary, or an unregistered word, imparting a passable, generic semantic attribute close to the concept in the source language to the restricted-side word, so that the semantic analysis will not fail; and (4) A learning function: a function of preferentially adopting a preselected or once-selected equivalent word, when a word in an input sentence has a plurality of equivalent words in the target language.

By having these functions, the machine translation systems are enabled to obtain a translation even if a plurality of syntactic analysis trees (i.e., parse trees) have resulted, or if a syntactic analysis tree that will cover the whole input sentence cannot be obtained, or if the input sentence includes any technical word or any word that has not been registered in the dictionary and all the syntactic analysis trees have failed as a result of such semantic analysis as described in paragraph (1) above.

However, the above-listed functions of the machine translation systems have the following problems:

(a) In the semantic analysis function in (1) above, if the semantic restrictions for excluding parse trees each forming a non-sentence from the obtained parse trees are too strict, all of the parse trees obtained may fail. Thus, there is a problem that too strict semantic restrictions cannot be used;

(b) In the divisional translation function in (2) above, translations are generated individually for particular syntactically imperfect partial trees. In this case, even if a translation is generated, the translation is sometimes peculiar and hard to understand;

(c) In the semantic attribute imparting function in (3) above, when the restricted-side word in an input sentence is a registered word of the user dictionary or the technical term dictionary or a registered word, the passable, generic "semantic attribute" would be imparted to the word as its semantic attribute. Accordingly, the semantic analysis of a sentence structure including such a word would lack in accuracy and therefore is not effective. Still more, in translating a document in which such words frequently occur, the semantic analysis may involve occurrence of noise, undesirably; and (d) In the learning function in (4) above, it is only when the parse tree of the input sentence coincides with the parse tree obtained during the learning process that a preferential equivalent word is adopted for translation and reflected upon the translation result.

SUMMARY OF THE INVENTION

The present invention has been developed with a view to substantially solving the above described disadvantages and has for its essential object to provide a machine translation system which can generate a high-accuracy translation by using strict semantic restriction information, and which does not fail to generate a translation even if an obtained syntactic structure or a case structure based on the syntactic structure fails as a result of the semantic analysis.

In order to achieve the above object, the present invention provides a machine translation system for generating a translation in a target language of an input text in a source language based on information stored in a dictionary, comprising:

a morphological analyzer for analyzing the input text into words;

a structure analyzer for obtaining a syntactic structure representing relations among the words of the input text and a case structure based on the syntactic structure;

a semantic analyzer for searching the dictionary for matching pieces of semantic information imparted to first and second words included in the input text and having a dependency relation in the syntactic structure and the case structure;

an equivalent word selector for selecting, as optimum equivalent words in the target language of the first and second words, equivalent words that are stored in an equivalent word storage area of the dictionary in correspondence with the matching pieces of semantic information;

a default equivalent word stored in the equivalent word storage area of the dictionary as part of the equivalent words of each word, the default equivalent word being a passable, generic equivalent word;

the dictionary having a further area for storing information indicating whether each equivalent word of each word is a default equivalent word or not; and a default equivalent word selector for searching the further area of the dictionary and selecting the default equivalent word of the first word as the optimum equivalent word of the first word.

The first word may be a word serving as a head of the input text such as a verb.

In an embodiment, the default equivalent word selector searches the further area of the dictionary to select the default equivalent word when the semantic analyzer finds no pieces of semantic information imparted to the first word that match a piece of semantic information imparted to the second word.

Accordingly, even if the syntactic structure or the case structure of the input text fails in the semantic analyzer because of use of strict semantic restrictions, a translation is securely generated by using the default equivalent word. This means that according to the present invention, strict semantic restrictions can be used. Therefore, when the semantic analyzer is successful, a high-accuracy translation can be generated.

In another embodiment of the invention, the machine translation system further comprises a storage memory for storing a condition on which the default equivalent word is preferentially selected and a translation of the input text is generated based on the default equivalent word. In this case, the default equivalent word selector searches the further area of the dictionary to select the default equivalent word of the first word when the condition is satisfied.

At least one of the following conditions may be used as the condition for preferentially selecting the default equivalent word for the translation of the input text:

1. The syntactic structure and the case structure of the input text do not include such a perfect dependency relation between the words as enables the semantic analyzer to search for the matching pieces of semantic information.
2. Preferential selection of the default equivalent word is prescribed by translation rules including grammatical rules used when the syntactic structure of the input text is obtained.
3. A default translation preference mode wherein the default equivalent word is preferentially selected has been set in advance by a user.

Other conditions can be used. Accordingly, by setting appropriate conditions, input texts of any nature can be translated without failure.

In a further embodiment of the invention, the machine translation system further comprises a default equivalent-word changer. This default equivalent-word changer changes the default equivalent-word of each word in the dictionary in response to instructions of a user by changing information stored in the further area of the dictionary, which information indicates whether or not each of the equivalent words stored in the dictionary is a default equivalent word.

That is, the default equivalent word of each word in the dictionary is changeable. A new default equivalent word of a certain word may be one of the other equivalent words of the word already stored in the dictionary. Otherwise, an additional equivalent word may be input and set as a new default equivalent word by the user. For this purpose, in another embodiment of the invention, the equivalent word storage area of the dictionary of the machine translation system has a spare area for storing an additional equivalent word to be inputted by the user and to be defined as the default word. With this arrangement, if no equivalent word appropriate as the default equivalent word has been registered in the dictionary, the user can add a new default equivalent word taking into consideration of various factors such as the field that the subject of the input text belongs to. Therefore, a more natural and understandable translation is obtained.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 illustrates a text stored in the text buffer of the machine translation system of FIG. 1;

FIG. 4 illustrates part of morphological information stored in a dictionary lookup buffer of the machine translation system of FIG. 1;

FIG. 5 illustrates an example of a parse tree stored in a syntactic structure buffer of the machine translation system of FIG. 1;

FIG. 6 illustrates an example of a case structure tree stored in a transformed-tree buffer of the machine translation system of FIG. 1;

FIG. 7 illustrates an example of a translation stored in an output sentence buffer of the machine translation system of FIG. 1;

FIG. 8 shows an example of contents of the dictionary of the machine translation system of FIG. 1;

FIG. 9 shows examples of default-translation preference conditions stored in the selection rule storage of the machine translation system of FIG. 1;

FIG. 12 shows an example of contents of a dictionary of a machine translation system according to a second embodiment of the present invention;

FIG. 13 shows an example of display contents displayed on the output unit of the machine translation system of the second embodiment during the default equivalent-word changing process;

FIG. 14 shows another example of display contents displayed on the output unit of the machine translation system during the default equivalent-word changing process;

FIG. 15 shows another example of contents of the dictionary of the machine translation system of the second embodiment;

FIG. 16 shows a further example of contents of the dictionary of the machine translation system of the second embodiment; and FIG. 17 shows examples of Japanese translations obtained by the machine translation system of FIG. 1.

DETAILED DESCRIPTION OF THE PREFERRED EMBODIMENTS

Hereinbelow, the present invention is described in more detail by referring to embodiments thereof as shown in the accompanying drawings. A first embodiment is described based on an example in which, even if an obtained case structure has failed and the semantic analyzer fails, translation process is executed such that, to make the case structure passed, a word in a source language serving as the "head" (a restricting-side word) is given a default equivalent word in a target language.

Figure 1:
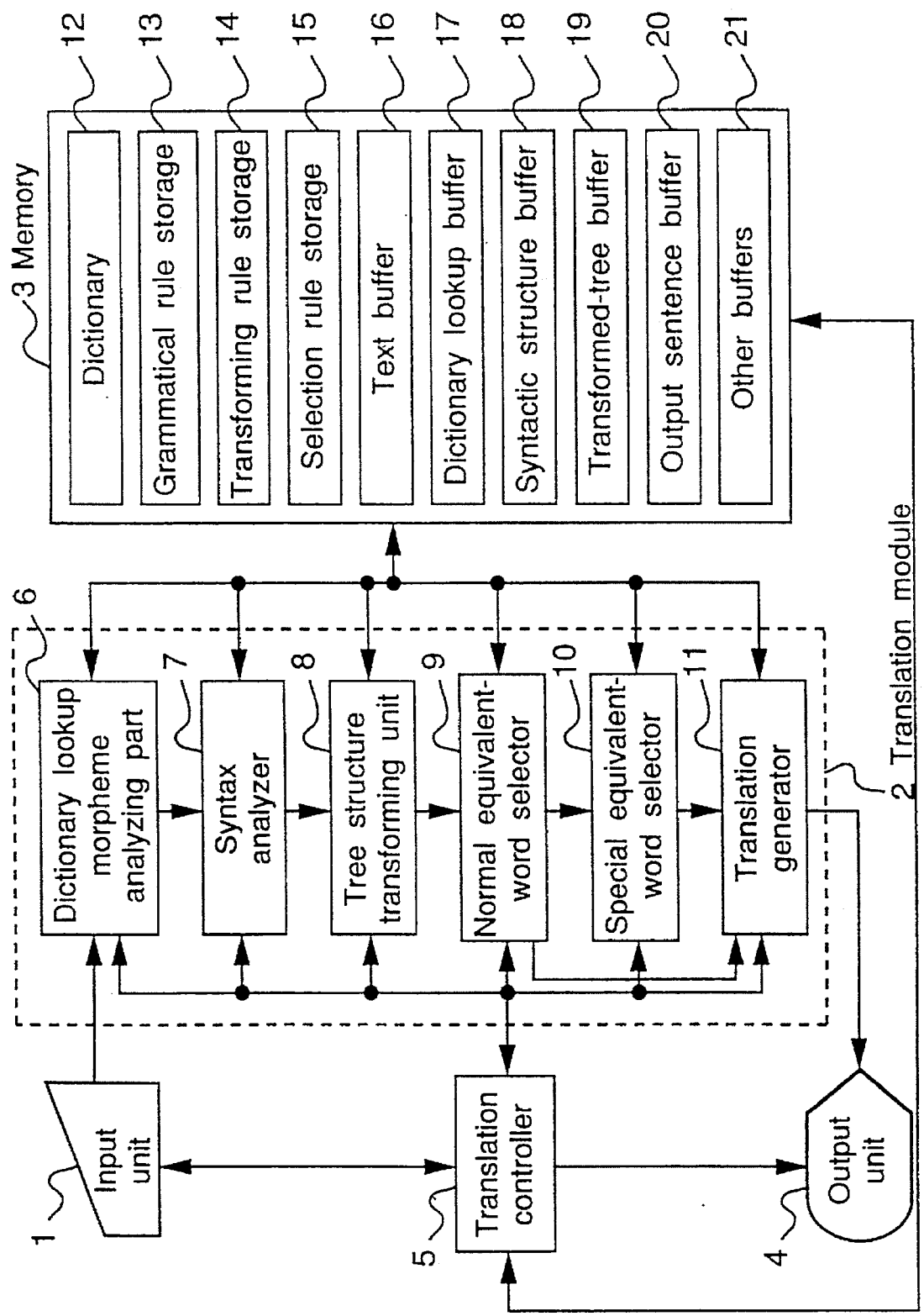
FIG. 1 is a block diagram of a machine translation system according to an embodiment of the present invention.

FIG. 1 is a block diagram of the machine translation system of the present embodiment.

An input unit 1 includes a keyboard, an OCR (Optical Character Reader), and the like. The translation system can be set to various translation modes such as default-translation preference mode or automated divisional translation mode through operation of the input unit 1. A text in a source language, which will be an object of translation, is input through the input unit 1. A translation module 2 has a dictionary-lookup morpheme analyzing part 6, a syntax analyzer 7, a tree structure transforming unit 8, a normal equivalent-word selector 9, and a special equivalent-word selector 10, and a translation generator 11, and performs a translation process on a text inputted from the input unit 1. A memory 3 has a dictionary 12, a grammatical rule storage 13, a transforming rule storage 14 for storing tree-structure transforming rules, a selection rule storage 15 for storing rules for selecting equivalent words in a target language (referred to simply as equivalent words) such as default-translation preference conditions described later, as well as various types of buffers 16, 17, 18, 19, 20, 21 for temporarily storing information obtained in performing the translation process, as described later. An output unit 4 includes a CRT (Cathode Ray Tube), a printer, and the like, and outputs a translation in the target language obtained by the translation module 2.

A translation controller 5 controls the input unit 1, the translation module 2, the memory 3, and the output unit 4 to perform the translation process.

The grammatical rule storage 13 of the memory 3 stores the following grammatical rules.

| SENTENCE | → SUBJECT + PREDICATE |
|---|---|
| SUBJECT | → NOUN PHRASE |
| PREDICATE | → VERB + NOUN PHRASE |
| NOUN PHRASE | → PRONOUN |
| NOUN PHRASE | → ARTICLE + NOUN |
| ... | → ... | where the above first grammatical rule represents that "A sentence consists of a subject and a predicate."

Figure 2:
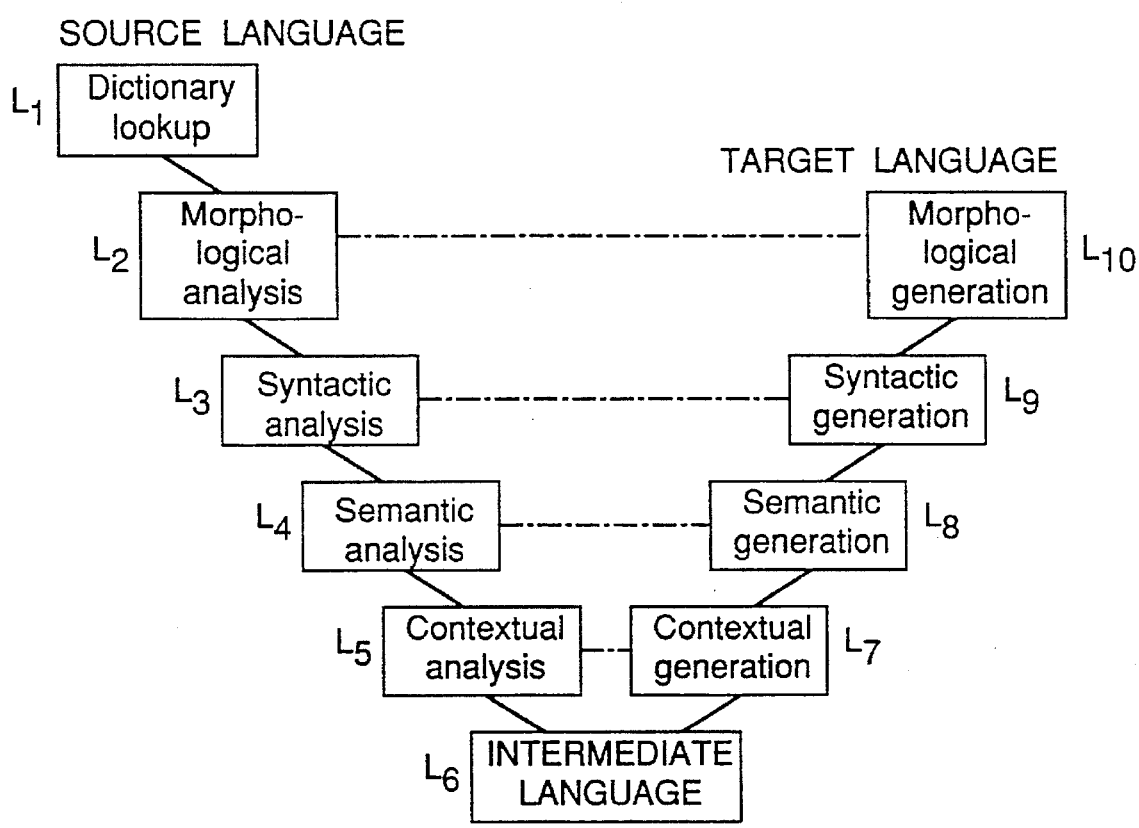
FIG. 2 is an explanatory illustration of the translation levels.

The translation process executed by the translation module 2 is generally of such levels as shown in FIG. 2. The left half of the figure shows analyzer levels in a source language, while the right half shows generation levels in a target language.

If a sentence or statement in a source language is inputted, analyzer proceeds through steps of dictionary lookup at analyzer level $L_1$, morphological analyzer at analyzer level $L_2$, syntactic analyzer at analyzer level $L_3$, . . . .

The machine translation methods are classified roughly into two categories by the analyzer levels adopted. One of the two is the pivot method. In this method, analyzer is effected up to a concept (referred to as an intermediate language) independent of both a source language and a target language at analyzer level $L_6$. This is followed by the steps of contextual generation at generation level $L_7$, semantic generation at generation level $L_8$, syntactic generation at generation level $L_9$, and morphological generation at generation level $L_{10}$. Thus, a sentence in the target language is generated.

The other is the transfer method. In this method, analyzer is effected up to any one of the steps of morphological analyzer at analyzer level $L_2$, syntactic analyzer at analyzer level $L_3$, semantic analyzer at analyzer level $L_4$, and contextual analyzer at analyzer level $L_5$, so that an internal structure in a source language is obtained. Next, the obtained internal structure in the source language is converted into an internal structure in a target language of the equal level, and thereafter a sentence in the target language is generated.

The machine translation system with the above-described arrangement translates a source language into target language through the following operation. In the following description, the source language is English and the target language is Japanese.

When an English text "This is a pen." is inputted from the input unit 1 and an instruction for starting the translation operation is issued, the translation operation starts. The input text gets stored in a text buffer 16 of the memory 3 as shown in FIG. 3.

Then, under control of the translation controller 5, the text stored in the text buffer 16 is divided into morphemes (hereinafter, referred to as words) by the dictionary lookup morpheme analyzing part 6 of the translation module 2 by using information in the dictionary 12 of the memory 3. As a result, information including parts of speech of the English words and Japanese equivalent words of the English words is obtained. The information obtained in this way is stored in a dictionary lookup buffer 17 as shown in FIG. 4.

Next, based on both the information stored in the dictionary lookup buffer 17 and the grammatical rules stored in the grammatical rule storage 13, a parse tree representing a relation among the words is determined by the syntax analyzer 7 of the translation module 2, and stored in a syntactic structure buffer 18 as shown in FIG. 5. Subsequently, based on the tree-structure transforming rules stored in the transforming rule storage 14 of the memory 3, a structure of the parse tree of the English text stored in the syntactic structure buffer 18 is transformed into a case structure tree of the Japanese language by the tree structure transforming unit 8. The resulting case structure tree is stored in a transformed-tree buffer 19 as shown in FIG. 6.

Next, a Japanese equivalent of each English word to be assigned to each element in the case structure tree is determined by the normal equivalent-word selector 9 and the special equivalent-word selector 10 of the translation module 2 by searching the dictionary 12 and with reference to the default-translation preference conditions stored in the selection rule storage 15 in a manner as will be detailed later (FIG. 6 illustrates a state that equivalent words have already been assigned to the elements of the case structure tree). Then, a Japanese translation is generated by the translation generator 11 based on both the case structure tree and the Japanese equivalent words assigned to the elements of the tree, and the Japanese translation is stored in an output sentence buffer 20 of the memory 3 as shown in FIG. 7. The thus generated Japanese translation of the English text is outputted by the output unit 4.

Next described in detail are the contents of the dictionary 12, the contents of the default-translation preference conditions, and the operation of the normal equivalent-word selector 9 and the special equivalent-word selector 10 in the translation module 2.

FIG. 8 shows an example of the arrangement of the dictionary 12 for "ENTRY WORD : play", wherein parts relevant to the invention are shown. As obvious from FIG. 8, stored in the dictionary 12 are, for each entry word, at least, surface-case pattern number, default translation flag, equivalent-word page number, equivalent word, first-case semantic restriction, and second-case semantic restriction.

In the "SURFACE-CASE PATTERN NO." filed of the dictionary 12, a number representing a surface-case pattern (i.e. a pattern of the case structure) is written. The following shows examples of the surface-case pattern number:

| SURFACE-CASE PATTERN NO. | SURFACE-CASE PATTERN |
| --- | --- |
| 00 | → SUBJECT + VERB + NOUN PHRASE (OBJECT) |
| 13 | → SUBJECT + VERB + PREPOSITIONAL PHRASE (with) |

In the "DEFAULT TRANSLATION FLAG" field, a flag indicating whether the equivalent word written in the field "EQUIVALENT WORD" is a default equivalent word or not is set.

| DEFAULT TRANSLATION FLAG | |
| --- | --- |
| 0 | → Not a default equivalent word. |
| 1 | → A default equivalent word. |

In the "EQUIVALENT-WORD PAGE NO." field, a serial number given to each of equivalent words belonging to the same surface-case pattern number is written.

In the "FIRST-CASE SEMANTIC RESTRICTION" field, a semantic restriction for a word or phrase serving as the "subject" in the surface-case pattern represented by the surface-case pattern number (hereinafter, referred to as first-case phrase) is written.

In the field "SECOND-CASE SEMANTIC RESTRICTION" field, a semantic restriction for a phrase serving as a "noun phrase" or "prepositional phrase" in the surface-case pattern represented by the surface-case pattern number (hereinafter, referred to as second phrase) is written.

FIG. 9 shows an example of default-translation preference conditions stored in the selection rule storage 15 in the memory 3. The default-translation preference conditions include conditions of texts and translation modes for which the default translation should be preferentially executed, as will be detailed later.

The following describes the operation of selecting an equivalent word from the dictionary 12, referencing the default-translation preference conditions, the selecting operation being performed by the normal equivalent-word selector 9 and the special equivalent-word selector 10 of the translation module 2 in connection with three different examples 1, 2 and 3.

Figure 10:
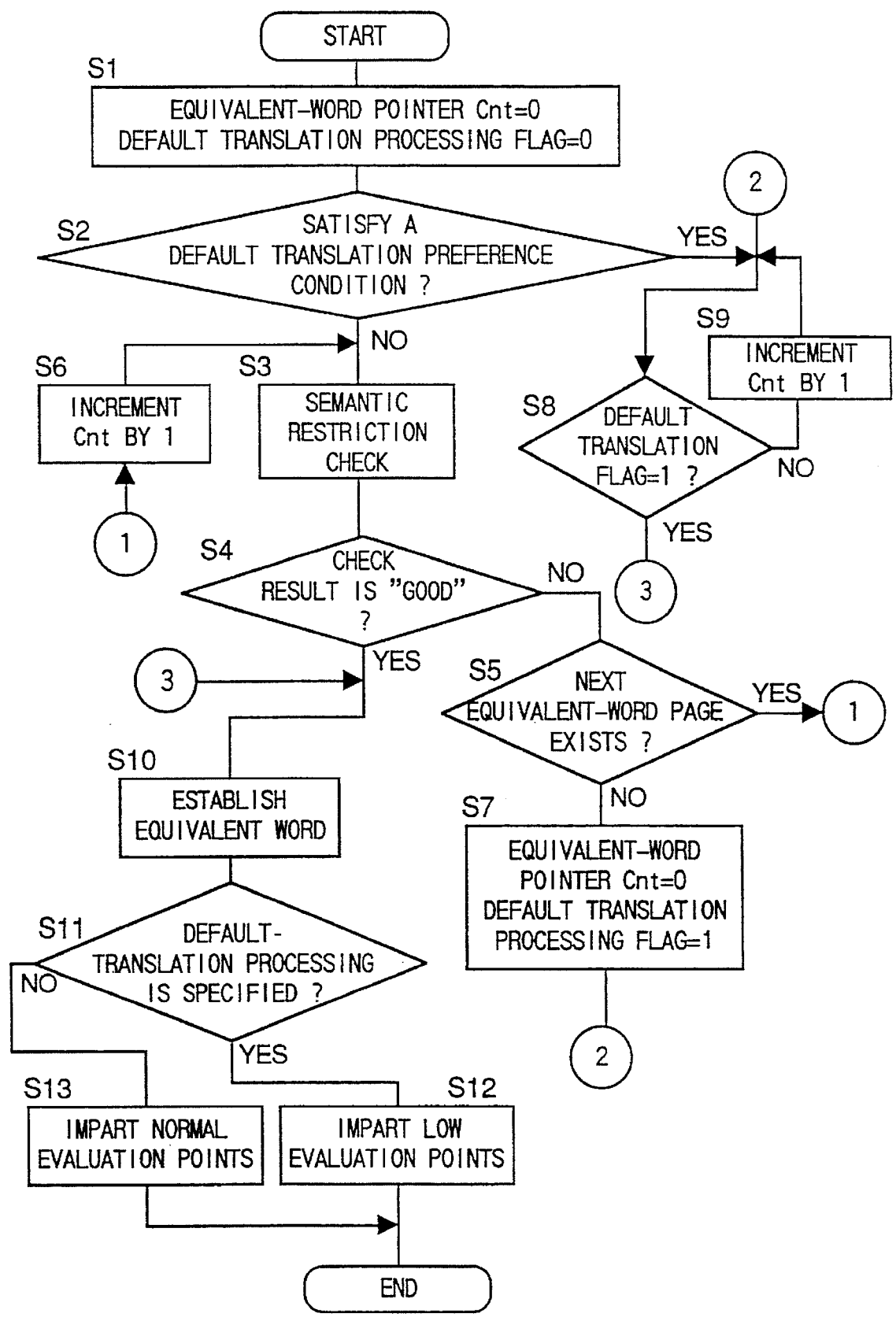
FIG. 10 is a flow chart of the equivalent-word selection operation executed by the normal equivalent-word selector and the special equivalent-word selector of the machine translation system of FIG. 1.

FIG. 10 is a flow chart of the operation of equivalent-word selection process for one case structure tree executed by the normal equivalent-word selector 9 and the special equivalent-word selector 10 under control of the translation controller 5.

Note that the source language is English and the target language is Japanese in the following examples and that Japanese words are expressed in Roman characters in the specification although expressed in kanji and hirakana in the drawings.

EXAMPLE 1

First, with reference to FIGS. 1 and 8–10, the equivalent-word selection operation is described by way of an example in which the "default translation" processing is not executed.

Now assume that the following text 1 is inputted from the input unit 1.

TEXT 1 : "I play the piano."

It is also assumed that the tree transformation process for the translation of the TEXT 1 has been completed by the tree structure transforming unit 8 in the translation module 2, so that a case structure tree originating from the TEXT 1 has been obtained and stored in the transformed-tree buffer 19.

Hereinbelow, the equivalent-word selection operation in this embodiment is explained for a case structure tree corresponding to the surface-case pattern "SUBJECT+ VERB+NOUN PHRASE (OBJECT)", which is one of the case structure trees stored in the transformed-tree buffer 19.

Now the operation of normal equivalent-word selection process by the normal equivalent-word selector 9 starts.

At step S1, a "0" is set to an equivalent-word pointer Cnt, which indicates the position of an equivalent word of an entry word "play" in the dictionary 12 using the equivalent-word page number as an index, the entry word "play" corresponding to the head "play" of TEXT 1. Further, a "0" is set to a "default translation processing flag" provided in the buffer 21 in the memory 3, whereby it is indicated that the default translation processing mode is not specified.

AS a result, in the area for the entry word "play" of the dictionary 12, the row for the equivalent word "SURU" of the surface-case pattern No. "00" having a "000" written in the field of "EQUIVALENT-WORD PAGE NO." is designated.

At step S2, with reference to the contents of the default-translation preference conditions stored in the selection rule storage 15, it is checked whether or not TEXT 1 satisfies any one of the default-translation preference conditions. If any one of the conditions is satisfied, the program goes to step S8. If not, it goes to step S3.

In this example, since none of the default-translation preference conditions is met, the program goes to step S3.

At step S3, the dictionary 12 is referenced in the following manner, so that semantic restriction check is executed.

First, the "FIRST-CASE SEMANTIC RESTRICTION" and "SECOND-CASE SEMANTIC RESTRICTION" fields in the row of the equivalent word "SURU" for the entry word "play," which row has been specified by the equivalent-word pointer Cnt, are referenced. Then, it is checked whether or not the semantic attribute given to an entry word "I" corresponding to the first-case word of TEXT 1 coincides with the contents of the "FIRST-CASE SEMANTIC RESTRICTION" field. It is further checked whether or not the semantic attribute given to an entry word "piano" corresponding to the second-case word of TEXT 1 coincides with the contents of the "SECOND-CASE SEMANTIC RESTRICTION" field.

At step S4, it is checked whether or not the result of the above semantic restriction check carried out at step S3 is "GOOD" (i.e. coincidence has occurred for both of the first-case and the second-case phrases or words). If the semantic restriction check result is "GOOD," the program goes to step S10. If not, it goes to step S5.

Here assume that the entry word "I" in the dictionary 12 is given a semantic attribute of <human being>, and that the entry word "piano" is given a semantic attribute of <musical instrument>. Then, the semantic attribute <human being>given to the entry word "I" corresponding to the first-case word or phrase of TEXT 1 coincides with the contents <human being> of the "FIRST-CASE SEMANTIC RESTRICTION" field in the row of the equivalent word "SURU" of the entry word "play." On the other hand, the semantic attribute <musical instrument> given to the entry word "piano" corresponding to the second-case word or phrase of TEXT 1 does not coincide with the contents <sport> of the "SECOND-CASE SEMANTIC RESTRICTION" field in the same row of the same entry word "play." Therefore, the semantic restriction check result for TEXT 1 is determined not to be good, and the program goes to step S5.

At step S5, it is determined whether or not there exists a next equivalent-word page for the entry word "play" in the dictionary 12. If it exists, the program goes to step S6. If not, it goes to step S7.

In this example, since the equivalent-word page No. "001" for the equivalent word "PUREI SURU" exists in succession to the equivalent-word page No. "000", the program goes to step S6.

At step S6, the value of the equivalent-word pointer Cnt is incremented by one. In this way, a row assigned to an equivalent word of the next equivalent-word page no. "001" is specified, and the program returns to step S3, where the semantic restriction check is executed with respect to the equivalent word "PUREI SURU".

The semantic attribute <musical instrument> given to the entry word "piano" corresponding to the second-case word or phrase of TEXT 1 does not coincide with the contents <game> of the "SECOND-CASE SEMANTIC RESTRICTION" field in the row of the equivalent word "PUREI R" of the entry word "play." Therefore, the semantic restriction check result is determined not to be "GOOD" at step S4, and another equivalent word "ENSO SURU" of the next equivalent word page no. 002 is specified at step S6. Then, the semantic condition check is further repeated.

In the case of this equivalent word "ENSO SURU", the semantic attribute <musical instrument> given to the entry word "piano" coincides with the contents <musical instrument> of the "SECOND-CASE SEMANTIC RESTRICTION" field in the row of the equivalent word "ENSO SURU" of the entry word "play." Therefore, the semantic condition check result is determined to be "GOOD" at step S4, and the program goes to step S10.

At step S10, the equivalent word "ENSO SURU" of the entry word "play" designated by the equivalent-word pointer Cnt is established as the optimum equivalent word for the head "play" of TEXT 1.

At step S11, with reference to the state of the default translation processing flag provided in the buffer 21, it is determined whether or not the default translation processing should be performed. If the flag indicates that the default translation processing should be effected, the program goes to step S12. If the flag indicates that the default translation processing should not be performed, the program goes to step S13.

At this stage, the state of the default translation processing flag provided in the buffer 21 of the memory 3 still remains to be "0" as set at the foregoing step S1. Therefore, the program goes to step S13.

At step S13, a normal evaluation point is imparted to the case structure tree corresponding to the surface-case pattern "SUBJECT+VERB+NOUN PHRASE (OBJECT)," which is the object of the present equivalent-word selection process. Then, the operation of equivalent-word selection is ended.

In this way, as a result of the normal semantic restrictions check by the normal equivalent word selector 9, "ENSO SURU" is decided to be the equivalent word of the verb "play" of TEXT 1. Then, the case structure tree corresponding to the surface-case pattern "SUBJECT+VERB+NOUN PHRASE (OBJECT)," to which the normal evaluation point has been imparted, is selected as the case structure tree of the translation.

Then, with reference to information on morphological analyzer results stored in the dictionary lookup buffer 17, equivalent words of all the words that are the elements of the selected case structure tree originating from TEXT 1 are obtained. Thus, the following translation of TEXT 1

TRANSLATION 1 : "WATASHI HA, PIANO WO ENSO SURU." is generated by the translation generator 11 of the translation module 2, then stored in the output sentence buffer 20 of the memory 3, and finally outputted from the output unit 4.

EXAMPLE 2

Next described is the equivalent-word selection executed through the "default translation" processing, which is the characteristic of the present embodiment.

Now assume that the following text is inputted.

TEXT 2 :"I play the computer."

It is also assumed that translation process on TEXT 2 has been effected up to the tree structure transformation step by the tree structure transforming unit 8 in the translation module 2, so that a case structure tree originating from TEXT 2 has been obtained and stored in the transformed-tree buffer 19.

In a manner similar to that in the above-described normal equivalent-word selection process, the normal equivalent-word selector 9 performs the initial value setting on both the equivalent-word pointer Cnt and the default translation processing flag in step S1, the default-translation preference conditions check in step S2, the semantic restriction check in step S3, the discrimination on the semantic restriction check result in step S4, the discrimination on the presence of the next equivalent-word page in step S5, and the increment of the equivalent-word pointer Cnt in step S6.

Now assume that an entry word "I" in the dictionary 12 is given a semantic attribute of <human being>. Also, assume that an entry word "computer" is given none of <sport>, <game>, <musical instrument>, or <obligation or business-like deed> as the semantic attribute.

Then, TEXT 2 satisfies none of the default translation preference conditions. The semantic attribute given to the entry word "computer" corresponding to the second-case word or phrase of TEXT 2 does not coincide with any of the contents of the "SECOND-CASE SEMANTIC RESTRICTION" field in all the rows that have a surface-case pattern number "00" for the entry word "play." Therefore, the steps S3 through S6 of FIG. 10 are repeated four times. After that, it is determined at step S5 that there exists no next equivalent-word page No. following the equivalent-word page No. "003." As a result, the program proceeds to step S7.

Thus, the program enters the operation of special equivalent-word selection process by the special equivalent-word selector 10.

At step S7, a "0" is set to the equivalent-word pointer Cnt. Besides, a "1" is set to the default translation processing flag provided in the buffer 21 of the memory 3, whereby the default translation processing is indicated.

At step S8, it is discriminated whether or not a "1" has been written in the "DEFAULT TRANSLATION FLAG" field in the row of the equivalent-word page No. "000" of the entry word "play" that is indicated by the equivalent-word pointer Cnt. If a "1" has been written in that field, indicating that the equivalent word of the indicated equivalent-word page No. is a "default equivalent word," the program goes to step S10. If not, the program goes to step S9, at which the value of the equivalent-word pointer Cnt is incremented by one. In this way, the row of an equivalent word of the next equivalent-word page No. is indicated. Then, the program returns to step S8, where the content of the "DEFAULT TRANSLATION FLAG" field is checked.

In this way, the default equivalent word is sought while the equivalent-word page No. is incremented at step S9. When an equivalent word "PUREI SURU," which is a default equivalent word, is found, the program goes to step S10, where the equivalent word "PUREI SURU," of the entry word "play" is established as the optimum equivalent word of the head "play" of TEXT 2.

Further, at step S11, with reference to the contents of the default translation processing flag provided in the buffer 21, it is determined that the default translation processing is designated. Thus, the program goes to step S12.

At step S12, low evaluation points are imparted to the case structure tree corresponding to the surface-case pattern "SUBJECT+VERB+NOUN PHRASE (OBJECT)," which is the object of the present equivalent-word selection process. Then, the operation of equivalent-word selection process is ended.

As described above, in the case of TEXT 2, since the equivalent word of the verb "play" cannot be determined by the normal equivalent-word selection process executed by the normal equivalent-word selector 9, the program moves to the operation of special equivalent-word selection process executed by the special equivalent-word selector 10, where the default equivalent word "PUREI SURU" is determined as the equivalent word of the verb "play."

Afterward, with reference to the information indicative of the morphological analyzer results stored in the dictionary lookup buffer 17 as described before, Japanese equivalent words of all the English words, which are the elements of the case structure tree originating from TEXT 2, are obtained. Thus, the following translation of TEXT 2:

TRANSLATION 2 : "WATASHI HA, KOMPYUTA WO PUREI SURU."

is generated by the translation generator 11 of the translation module 2, then stored in the output sentence buffer 20, and finally outputted from the output unit 4.

Thus, in the present embodiment, if the surface-case pattern based on an arbitrary case structure tree obtained by the processing on the text by the dictionary lookup morpheme analyzing part 6, the syntax analyzer 7, and the tree structure transforming unit 8 fails in the semantic analyzer in the normal equivalent-word selection process executed by the normal equivalent-word selector 9, a default equivalent word is given by the special equivalent-word selection process executed by the special equivalent-word selector 10. For this process, low evaluation points are imparted to the pertinent case structure tree.

Accordingly, even if no strict, precise semantic restriction information is written in the "FIRST-CASE SEMANTIC RESTRICTION" field and the "SECOND-CASE SEMANTIC RESTRICTION" field in the dictionary 12, it is possible to finally pass the surface case pattern in the semantic analysis by adopting a default equivalent word as described above. Furthermore, by imparting low evaluation points to the case structure tree, another case structure tree of more certainty (i.e. with normal evaluation points imparted thereto), if present in the same text, can be preferentially selected.

Therefore, according to the present embodiment, it is possible to accomplish both the generation of a high-accuracy translation by precision semantic analyzer and the generation of a translation using default equivalent words.

EXAMPLE 3

Now, an example wherein an equivalent word specified as a default equivalent word is preferentially selected if the text satisfies any one of the various relevant conditions is described. In this example, the machine translation system adopts the "automated divisional translation mode". In the "automated divisional translation mode," one text is automatically divided so that its clauses are individually subjected to syntactic analyzer process and transformation process by the syntax analyzer 7 and the tree structure transforming unit 8, respectively, as described below.

Now assume that the following text is inputted and that the "automated divisional translation mode" is appointed in the translation processing.

TEXT 3 : "I bought an expensive machine which my son plays."

Then, TEXT 3 is divided into two parts, a first-half TEXT 3a "I bought an expensive machine" and a second-half TEXT 3b "which my son plays." The two are each subjected to the processing up to the tree structure transformation by the tree structure transforming unit 8 in the translation module 2. As a result, a case structure tree originating from TEXT 3a and another case structure tree originating from TEXT 3b are obtained and stored in the transformed-tree buffer 19.

After that, the program enters the operation of the equivalent-word selection process by the normal equivalent-word selector 9 and the special equivalent-word selector 10 in accordance with the flow chart shown in FIG. 10.

Note that the equivalent-word selection process for TEXT 3a is similar to that for TEXT 1 and detailed description thereon is omitted here.

Below described is the equivalent-word selection relating to the head "play" in TEXT 3b, "which my son plays."

The case structure of this clause "which my son plays", although irregular, is of a surface-case pattern "SUBJECT+VERB+NOUN PHRASE (OBJECT)" represented by the surface-case pattern No. "00." However, in this clause a noun phrase as an object, i.e., a second-case word or phrase is missing. It is therefore apparent that a Japanese equivalent word of the English word "play" cannot be selected by the conventional equivalent-word selection process and that the pertinent case structure tree will fail.

First, at step S1, with a "0" set to the equivalent-word pointer Cnt, the row of equivalent word "SURU" of equivalent-word page No. "000" in the entry word "play" in the dictionary 12 is indicated. Further, a "0" is set to the default-translation processing flag provided in the buffer 21 of the memory 3.

Subsequently, at step S2, the default-translation preference condition check is executed with reference to the default-translation preference conditions stored in the selection rule storage 15.

In this example, the "automated divisional translation mode" has been set as described above, and TEXT 3b has an imperfect case structure tree. Accordingly, since TEXT 3b meets the condition number "00" shown in FIG. 9, the program goes to step S8 for the default-translation preferential processing to be executed by the special equivalent-word selector 10.

The steps S8 and S9 for checking the contents of the "DEFAULT TRANSLATION FLAG" field is repeated row by row until the row for the equivalent word "PUREI SURU" is checked. Because the equivalent word "PUREI SURU" is defined as a default equivalent word (the content of the "DEFAULT TRANSLATION FLAG" field is one (1)), this equivalent word "PUREI SURU" is established as the optimum equivalent word of the head "play" of TEXT 3b at step S10.

Next, the default translation processing check is executed at step S11. Since the Default translation processing flag provided in the buffer 21 of the memory 3 does not indicate execution of the default translation processing (i.e. the content of the default translation processing flag remains "0" because the step S7 is not executed in the present example), the program goes to step S13 at which normal evaluation points are imparted to a case structure tree, which is one of the case structure trees of TEXT 3b obtained by the tree structure transforming unit 8 and which is of the surface-case pattern "SUBJECT+VERB+NOUN PHRASE (OBJECT)" that is the object of the current equivalent-word selection process.

After that, with reference to the morphological analyzer results stored in the dictionary lookup buffer 17, Japanese equivalent words of all the English words that are the elements of the case structure tree originating from TEXT 3b are obtained, and a Japanese translation of TEXT 3b is generated by the translation generator 11 of the translation module 2. Similarly, a Japanese translation of TEXT 3a is also generated. As a result, the following Japanese translation of TEXT 3

TRANSLATION 3: "WATASHI HA, KOKANA KIKAI WO KATTA‖WATASHI NO MUSUKO GA PUREI SURU."

is generated, stored in the output sentence buffer 20 of the memory 3, and outputted from the output unit 4.

As described above, in the present case, in obtaining Japanese equivalent words of all the English words that are the elements of the case structure tree obtained by the dictionary lookup processing executed on the text by the dictionary lookup morpheme analyzing part 6, the syntax analyzer 7, and the tree structure converter 8, if the text meets any one of the default-translation preference conditions stored in the selection rule storage 15 of the memory 3, a default equivalent word is preferentially selected through the default translation processing executed by the special equivalent-word selector 10, and normal evaluation points are given to the case structure tree.

Therefore, by setting proper default-translation preference conditions and positively giving a default equivalent word in the target language to a word in the source language by the special equivalent-word selector 10, even a case structure tree which would fail in the normal semantic analyzer executed by the normal equivalent-word selector 9 is passed. Thus, according to the present embodiment, a translation can be securely generated even if the text has an imperfect case structure. It is needless to say that the default translation preference conditions should not be limited to those shown in FIG. 9.

Also, the operation of equivalent-word selection process is not limited to that shown in FIG. 10.

In the above first embodiment, if the case structure tree obtained through the dictionary lookup, morphological analyzer, syntactic analyzer, and tree structure transformation executed on the text has failed in the semantic analyzer, or if the text meets some default-translation preference condition, a default equivalent word is selected so that the case structure tree is passed. However, there are some cases where even if such default translation processing is executed, the resulting translation may differ from an expected translation and require corrections by man.

This problem is solved by the following embodiment wherein a default word is changeable as requested by an operator.

In a second embodiment the machine translation system is identical in basic arrangement and operation to the machine translation system in the first embodiment.

A change of the default word is done by an operator's specifying one of equivalent words already registered in the dictionary 12 as a new default equivalent word, or by an operator's inputting a new equivalent word and specifying it as a new default equivalent word.

Figure 11:
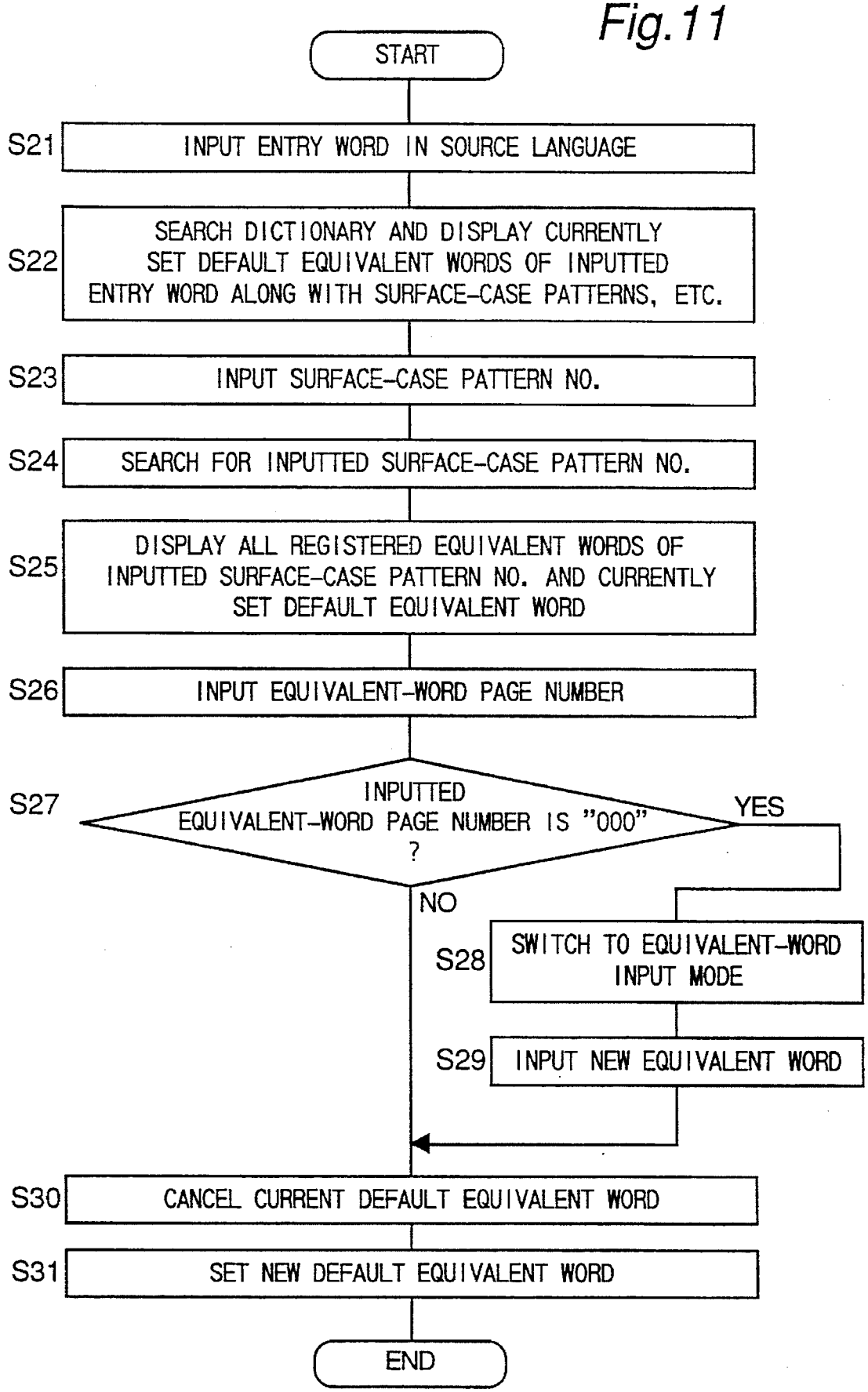
FIG. 11 is a flow chart of the default equivalent-word changing operation executed under control of the translation controller in FIG. 1.

FIG. 11 is a flow chart of the operation for changing the default equivalent word executed by the translation controller 5. The operation of default equivalent-word changing process is described below on an example in which the operator specifies a default equivalent word for a verb "introduce."

Now assume that, in the memory area for the entry word "introduce" in the dictionary 12, contents of the fields of "SURFACE-CASE PATTERN NO.," "DEFAULT TRANSLATION FLAG," "EQUIVALENT-WORD PAGE NO.," and "EQUIVALENT WORD" are as shown in FIG. 12. It is noted that in the "EQUIVALENT WORD" field, an additional equivalent word is to be set as a new default equivalent word in an area for equivalent-word page No. "000." Although only the rows of the surface-case pattern No. "00" are shown in FIG. 12, further rows of the other surface-case pattern Nos. also exist for the entry word "introduce."

At step S21, an entry word "introduce" is input from the input unit 1.

At step S22, the fields of "ENTRY WORD," "SURFACE-CASE PATTERN NO.," "DEFAULT TRANSLATION FLAG," and "EQUIVALENT WORD" of the dictionary 12 are searched, so that default equivalent words currently set individually for all the surface-case pattern Nos. in the entry word "introduce" are read out. Then, the default equivalent words read out are displayed on the output unit 4 such as a CRT along with the entry word, the surface-case pattern numbers, and the surface-case patterns, as shown in FIG. 13.

At step S23, a surface-case pattern No., for which the default equivalent word is to be changed, is inputted by the operator in the "SELECTION NO." area provided at the bottom of the display screen.

Assume that a surface-case pattern No. "00" is selected in this example.

At step S24, dictionary areas for the surface-case pattern No. "00" for the entry word "introduce" registered as shown in FIG. 12 are searched.

At step S25, all the equivalent words registered in the areas for the pertinent surface-case pattern No. "00" of the entry word "introduce," and the currently set default equivalent word "SHOKAI SURU" of the equivalent word No. 001 are displayed on the output unit 4 as shown in FIG. 14.

At step S26, in the "SELECTION NO." area provided at the bottom of the display screen of FIG. 14, the equivalent-word page No. of an equivalent word desired to be newly set as the default equivalent word is inputted.

Assume that an equivalent-word page No. "000" is selected in this example.

At step S27, it is determined whether or not the equivalent-word page No. inputted at the foregoing step S26 is "000." If it is "000," the program goes to step S28. If not, it goes to step S30.

At step S28, the operation mode is switched to an equivalent-word input mode in which the operator is allowed to directly input a new equivalent word to be set as a new default equivalent word.

At step S29, in the equivalent-word input mode, a new equivalent word, for example, "SENDO SURU", is inputted.

Then, at step S30, as shown in FIG. 15, the default equivalent word flag "1" set in the row of the equivalent-word page No. 001 for the equivalent word "SHOKAI SURU" is rewritten to "0", whereby the equivalent word "SHOKAI SURU" is cancelled from the designation of the default equivalent word.

At step S31, a "1" is written in the "DEFAULT TRANSLATION FLAG" field in the row pertinent to the equivalent-word page No. (in this case "000") inputted at step S26, whereby a new default equivalent word "SENDO SURU" is established. Thus, the default equivalent-word changing operation is ended.

FIG. 15 shows contents of the dictionary 12 for the surface-case pattern No. "00" of the entry word "introduce" after the equivalent word "SENDO SURU" newly inputted in the "EQUIVALENT WORD" field of the equivalent-word page No. 000 has been established as the default equivalent word. As shown in FIG. 15, the default translation flag of the new equivalent word "SENDO SURU" assumes a value of 1 and that of the equivalent word "SHOKAI SURU" being the previous default equivalent word now assumes a value of 0.

In the above example, the previously set default equivalent word is replaced by the newly inputted equivalent word. Alternatively, the previously set default equivalent word is replaced by one of the other equivalent word or words already registered in the dictionary 12 by selecting a desired one of the equivalent-word page Nos. displayed on the screen of FIG. 14. FIG. 16 shows contents of the dictionary 12 for the surface-case pattern No. "00" of the entry word "introduce," where the equivalent word "DONYU SURU" of equivalent-word page No. "002" has been specified as a default equivalent word.

Once the default equivalent word is changed as expected by the operator, the translating operation is carried out in the same manner as described above in connection with the first embodiment.

As described above, in the present embodiment, contents of the "DEFAULT TRANSLATION FLAG" field in the dictionary 12 can be updated on an interactive basis. Accordingly, the operator is allowed to change any default equivalent word at the operator's own discretion according to the field and nature of the input text, so that a translation that matches the operator's can be obtained.

In the described cases, the default equivalent-word changing process is executed for each particular surface-case pattern of the desired entry word. However, the present invention is not limited to this. Instead, the default equivalent-word changing process may be executed collectively for all of a plurality of surface-case patterns or collectively for individual groups of a plurality of surface-case patterns by grouping them.

In the above embodiments, English and Japanese are used as the source language and the target language, respectively, although it will be easily understood that other languages may be used as the source and target languages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A translation apparatus comprising:

transformation means for separating input text of a source language into words of the source language, generating a parse tree representing a syntactical relationship among the words of the source language and transforming the parse tree into a case structure of a target language;

a memory for storing a dictionary of words of the source language, a plurality of candidate equivalent words of the target language and a default equivalent word of the target language for each word of the source language, and plural semantic restriction data for each of the candidate equivalent words; and selection means for selecting for a word of the input text one of the respective candidate equivalent words of the target language from said memory having matching semantic restriction data with respect to the input text as an optimum equivalent word, selecting the default equivalent word for the word of the input text if no respective candidate equivalent word of the target language is found having matching semantic restriction data for the word and outputting selected optimum equivalent words and selected default equivalent words based on the case structure as a translation of the input text in the target language.

2. The translation apparatus of claim 1, further comprising input means for changing the default equivalent word of a word of the source language stored in said memory upon selection by a system operator.

3. The translation apparatus of claim 1, further comprising input means for inputting a new default equivalent word for a word of the source language stored in said memory upon selection by a system operator.

4. The translation apparatus of claim 1, wherein said memory further stores a condition for which said selection means selects the default equivalent word of a word of the input text and outputs the default equivalent word for the word of the input text when the condition is satisfied.

5. The translation apparatus of claim 4, further comprising input means for selection of a default translation preference mode in which the default equivalent word of an input word is preferentially selected and output by said selection means for the word of the input text, the condition being selection of the default preference mode by a system operator.

6. A translation method comprising the steps of:

a) separating input text of a source language into words of the source language;

b) generating a parse tree representing a syntactical relationship among the words of the source language;

c) transforming the parse tree into a case structure of a target language;

d) storing in a memory a dictionary of words of the source language, a plurality of candidate equivalent words of the target language and a default equivalent word of the target language for each word of the source language, and plural semantic restriction data for each of the candidate equivalent words;

e) selecting for a word of the input text one of the respective candidate equivalent words of the target language from the memory having matching semantic restriction data with respect to the input text as an optimum equivalent word;

f) selecting the default equivalent word for the word of the input text if no respective candidate equivalent word of the target language is found in the memory having matching semantic restriction data for the word; and g) providing selected optimum equivalent words and selected default equivalent words based on the case structure as a translation of the input text in the target language.

7. The translation method of claim 6, further comprising the step of changing the default equivalent word of a word of the source language stored in the memory upon selection by a system operator.

8. The translation method of claim 6, further comprising the steps of inputting a new default equivalent word for a word of the source language stored in the memory upon selection by a system operator.

9. The translation method of claim 6, further comprising the step of storing in the memory a condition for which selection of the default equivalent word of a word of the input text is prescribed, the default equivalent word being provided in said step g) for the word of the input text when the condition is satisfied.

10. The translation method of claim 9, further comprising the selection of a default translation preference mode in which the default equivalent word of an input word is preferentially selected and provided for the word of the input text, the condition being selection of the default preference mode by a system operator.

11. A machine translation system for generating a translation in a target language of an input text in a source language based on information stored in a dictionary, comprising:

morphological analyzer for separating the input text into words;

structure analyzer for obtaining a syntactic structure representing relations among the words of the input text and for obtaining a case structure based on the syntactic structure;

semantic analysis means for searching the dictionary for matching pieces of semantic information imparted to first and second words included in the input text having a dependency relation in the syntactic structure and the case structure;

an equivalent word selector for selecting, as optimum equivalent words in the target language for the first and second words, equivalent words that are stored in an equivalent word storage area of the dictionary in correspondence with the matching pieces of semantic information, a default equivalent word being stored in said equivalent word storage area of the dictionary as part of the equivalent words of each word, the default equivalent word being a passable, generic equivalent word, the dictionary having a further area for storing information indicating whether each equivalent word of each word is a default equivalent word or not;

a default equivalent word selector for searching the further area of the dictionary and selecting the default equivalent word of the first word as the optimum equivalent word of the first word; and storage means for storing a condition on which the default equivalent word is preferentially selected, a translation of the input text being generated based on the default equivalent word wherein said default equivalent word selector searches the further area of the dictionary to select the default equivalent word of the first word when the condition is satisfied.

12. The machine translation system of claim 11, wherein the condition for preferentially selecting the default equivalent word for the translation of the input text is that the syntactic structure and the case structure of the input text do not include such a perfect dependency relation between the words to enable said semantic analyzer means to search for the matching pieces of semantic information.

13. The machine translation system of claim 11, wherein the condition for preferentially selecting the default equivalent word for the translation of the input text is that preferential selection of the default equivalent word is prescribed by translation rules including grammatical rules used when the syntactic structure of the input text is obtained.

14. The machine translation system of claim 11, which has a default translation preference mode wherein the default equivalent word is preferentially selected, and wherein the condition for preferentially selecting the default equivalent word for the translation of the input text is that the default translation preference mode has been set in advance by a user.

15. The machine translation system of claim 11, further comprising:

default equivalent word changing means for changing the default equivalent word of each word in the dictionary in response to instructions of a user by changing contents of the further area of the dictionary.

16. The machine translation system of claim 15, wherein said equivalent word storage area of the dictionary has a spare area for storing an additional equivalent word to be inputted by the user and to be defined as the default equivalent word.

17. A method of generating a translation in a target language of an input text in a source language based on information stored in a dictionary, comprising the steps of:

a) analyzing the input text into words;

b) generating a syntactic structure representing relations among the words of the input text and a case structure based on the syntactic structure;

c) searching the dictionary for matching pieces of semantic information imparted to first and second words included in the input text having a dependency relation in the syntactic structure and the case structure;

d) selecting, as optimum equivalent words in the target language for the first and second words, equivalent words that are stored in an equivalent word storage area of the dictionary in correspondence with the matching pieces of semantic information;

e) storing a default equivalent word in the equivalent word storage area of the dictionary as part of the equivalent words of each word, the default equivalent word being a passable, generic equivalent word;

f) storing in a further area of the dictionary information indicating whether each equivalent word of each word is a default equivalent word or not;

g) storing in the dictionary a condition on which the default equivalent word is preferentially selected; and h) preferentially selecting the default equivalent word of the first word as the optimum equivalent word of the first word when the condition stored in said step g) is satisfied.

18. The method of generating a translation of claim 17, wherein the condition for preferentially selecting the default equivalent word for the translation of the input text is that the syntactic structure and the case structure of the input text do not include such a perfect dependency relation between the words to enable searching for the matching pieces of semantic information in said step c).

19. The method of generating a translation of claim 17, wherein the condition for preferentially selecting the default equivalent word for the translation of the input text is that preferential selection of the default equivalent word is prescribed by translation rules including grammatical rules used when the syntactic structure of the input text is obtained.

20. The method of generating a translation of claim 17, comprising a default translation preference mode in which the default equivalent word is preferentially selected, wherein the condition for preferentially selecting the default equivalent word for the translation of the input text is that the default translation preference mode has been set in advance by a user.

21. The method of generating a translation of claim 17, further comprising the step of:

i) changing the default equivalent word of each word in the dictionary in response to instructions of a user by changing contents of the further area of the dictionary.

22. The method of generating a translation of claim 21, wherein said step i) comprises storing an additional equivalent word in a spare area of the equivalent word storage area to be defined as the default equivalent word.

23. A machine translation system for generating a translation in a target language of an input text in a source language based on information stored in a dictionary, comprising:

morphological analyzer means for separating the input text into words;

structure analyzer for obtaining a syntactic structure representing relations among the words of the input text and for obtaining a case structure based on the syntactic structure;

semantic analyzer means for searching the dictionary for matching pieces of semantic information imparted to first and second words included in the input text having a dependency relation in the syntactic structure and the case structure;

an equivalent word selector for selecting, as optimum equivalent words in the target language for the first and second words, equivalent words that are stored in an equivalent word storage area of the dictionary in correspondence with the matching pieces of semantic information, a default equivalent word being stored in said equivalent word storage area of the dictionary as part of the equivalent words of each word, the default equivalent word being a passable, generic equivalent word, the dictionary having a further area for storing information indicating whether each equivalent word of each word is a default equivalent word or not; and a default equivalent word selector for searching the further area of the dictionary and selecting the default equivalent word of the first word as the optimum equivalent word of the first word when said semantic analysis means finds no pieces of semantic information imparted to the first word that match a piece of semantic information imparted to the second word.

24. The machine translation system of claim 1, further comprising:

default equivalent word changing means for changing the default equivalent word of each word in the dictionary in response to instructions of a user by changing contents of the further area of the dictionary.

25. The machine translation system of claim 24, wherein said equivalent word storage area of the dictionary has a spare area for storing an additional equivalent word to be inputted by the user and to be defined as the default equivalent word.

26. A method of generating a translation in a target language of an input text in a source language based on information stored in a dictionary, comprising the steps of:

a) analyzing the input text into words;

b) generating a syntactic structure representing relations among the words of the input text and a case structure based on the syntactic structure;

c) searching the dictionary for matching pieces of semantic information imparted to first and second words included in the input text having a dependency relation in the syntactic structure and the case structure;

d) selecting, as optimum equivalent words in the target language for the first and second words, equivalent words that are stored in an equivalent word storage area of the dictionary in correspondence with the matching pieces of semantic information;

e) storing a default equivalent word in the equivalent word storage area of the dictionary as part of the equivalent words of each word, the default equivalent word being a passable, generic equivalent word;

f) storing in a further area of the dictionary information indicating whether each equivalent word of each word is a default equivalent word or not; and g) selecting the default equivalent word of the first word as the optimum equivalent word of the first word when no pieces of semantic information imparted to the first word are found that match a piece of semantic information imparted to the second word in said step c).

27. The method of generating a translation of claim 26, further comprising the step of:

h) changing the default equivalent word of each word in the dictionary in response to instructions of a user by changing contents of the further area of the dictionary.

28. The method of generating a translation of claim 27, wherein the equivalent word storage area of the dictionary has a spare area for storing an additional equivalent word to be inputted by the user and to be defined as the default equivalent word.

* * * * *